US006986148B2

(12) United States Patent
Johnson, Jr. et al.

(10) Patent No.: US 6,986,148 B2
(45) Date of Patent: Jan. 10, 2006

(54) METHODS AND SYSTEMS FOR PROVIDING PLATFORM-INDEPENDENT SHARED SOFTWARE COMPONENTS FOR MOBILE DEVICES

(75) Inventors: Hollis Bruce Johnson, Jr., Atlanta, GA (US); Scott A. Blum, Stockbridge, GA (US); John Christopher Tyburski, Jonesboro, GA (US); Anthony Mark Lummus, Atlanta, GA (US); David Robert Martin, Atlanta, GA (US); Miguel Mendez, Atlanta, GA (US); Charles Edward Patisaul, Tucker, GA (US); Kevin Jay Hurewitz, Tucker, GA (US)

(73) Assignee: AppForge, Inc., Atlanta, GA (US)

( * ) Notice: Subject to any disclaimer, the term of this patent is extended or adjusted under 35 U.S.C. 154(b) by 508 days.

(21) Appl. No.: 09/907,403

(22) Filed: Jul. 17, 2001

(65) Prior Publication Data

US 2003/0018825 A1 Jan. 23, 2003

(51) Int. Cl.
*G06F 9/445* (2006.01)

(52) U.S. Cl. .............. 719/332; 707/103 Z; 707/103 R; 717/165; 717/163; 717/174; 719/316

(58) Field of Classification Search ........ 719/310–332; 717/120–123, 106–108, 174–178, 162–167; 707/1–10, 103
See application file for complete search history.

(56) References Cited

U.S. PATENT DOCUMENTS

| | | | | |
|---|---|---|---|---|
| 4,734,854 A | | 3/1988 | Afshar | |
| 5,615,400 A | * | 3/1997 | Cowsar et al. | 719/332 |
| 5,732,270 A | | 3/1998 | Foody et al. | |
| 5,758,154 A | * | 5/1998 | Qureshi | 713/1 |
| 5,802,367 A | * | 9/1998 | Held et al. | 719/332 |
| 5,848,272 A | * | 12/1998 | Breggin et al. | 719/315 |
| 5,890,158 A | | 3/1999 | House et al. | |
| 5,911,071 A | | 6/1999 | Jordan | |
| 5,923,878 A | | 7/1999 | Marsland | |
| 5,970,252 A | * | 10/1999 | Buxton et al. | 717/166 |
| 6,029,207 A | | 2/2000 | Heninger | |
| 6,038,558 A | | 3/2000 | Powers et al. | |
| 6,065,046 A | | 5/2000 | Feinberg et al. | |
| 6,141,724 A | | 10/2000 | Butler et al. | |
| 6,199,196 B1 | | 3/2001 | Mandany et al. | |
| 6,308,182 B1 | * | 10/2001 | Nishigaya et al. | 707/103 R |

(Continued)

OTHER PUBLICATIONS

Microsoft Corporation. "The Component Object Model Specification." Version 0.9: Oct. 24, 1995, submitted in response filed Nov. 8, 2004.*

*Primary Examiner*—Lewis A. Bullock, Jr.
(74) *Attorney, Agent, or Firm*—Thomas, Kayden, Horstemeyer & Risley, LLP

(57) ABSTRACT

Systems and methods integrate and provide platform independence to shared component objects. A host is targeted for a mobile device and registers software components. Upon a request for services by an application program, the host finds and facilitates the creation of instances requested by the application program, thereby providing platform independence to the application program and the developer thereof. A module, deployable unit of software components, is also an addressable and programmable object during a run time, thereby facilitating implicit registry of software components on the target device and reducing storage space required on a target device, as well as the CPU processing power. The module also provides module-wide variables, thereby enabling distinct instances constructed from classes contained within the module to share common variables.

40 Claims, 7 Drawing Sheets

U.S. PATENT DOCUMENTS

| | | | | |
|---|---|---|---|---|
| 6,347,398 | B1 * | 2/2002 | Parthasarathy et al. | 717/178 |
| 6,349,344 | B1 | 2/2002 | Sauntry et al. | |
| 6,389,589 | B1 * | 5/2002 | Mishra et al. | 717/170 |
| 6,564,377 | B1 * | 5/2003 | Jayasimha et al. | 717/174 |
| 6,802,061 | B1 * | 10/2004 | Parthasarathy et al. | 717/173 |
| 2005/0044541 | A1 * | 2/2005 | Parthasarathy et al. | 717/173 |

* cited by examiner

METHODS AND SYSTEMS FOR PROVIDING PLATFORM-INDEPENDENT SHARED SOFTWARE COMPONENTS FOR MOBILE DEVICES

TECHNICAL FIELD

This invention relates to providing programming environments for computing devices, and in particular, to providing programming environments that allow platform independence and dynamically extendible shared software components for mobile devices.

BACKGROUND OF THE INVENTION

With the fast growing popularity of mobile devices, such as Palm Pilots, mobile telephones, pagers and mobile computers, there is also a fast growing demand for application programs for mobile devices. However, developing software components for mobile devices is a difficult task because mobile devices operate under several constraints which are distinct from those imposed on corresponding non-mobile components.

First, mobile devices generally operate using rechargeable or replaceable batteries that are small and light, thus have low power capacity. Low power capacity limits the types of CPU's that can be used on a mobile device, as well as the manner in which the CPU performs its task. For example, a handheld computer employs a slower CPU using less power than a CPU in a corresponding desktop computer. In addition, the CPU in a handheld computer spends much time in a low power "doze" mode. Low power capacity also limits the types and the amount of storage devices used in mobile devices. For example, a handheld computer often employs power-efficient memory technologies, such as flash, and includes a significantly lower amount of memory components than those available for a corresponding a desktop computer. As another example, most of the mobile devices lack the memory management unit ("MMU") that efficiently handles the use of RAM during the run time and enables the passing of global variables. The lack of the MMU on a mobile device severely limits flexibility of the programming environments for software developers.

Second, mobile devices are generally constrained by limitations on their price ranges. The market dictates that the price of a handheld computer be significantly lower than that of a corresponding desktop computer. The price limitation implies that a handheld computer is built using components from older technologies vis-à-vis a corresponding desktop computer. In general, mobile devices are slower than their corresponding desktop devices.

A third constraint is that mobile devices require mobile solutions to a new set of problems. A wide variety of mobile hardware solutions, such as barcode scanners, mobile modems and global positioning modules, are available in the market. The mobile hardware solutions require significant efforts from software developers to integrate them with software solutions that would present to the end-customers easy and friendly user-interfaces. In addition, providers of hardware solutions are challenged to provide reasonable hardware-to-software interface mechanisms.

These constraints have resulted in providing static and non-expandable programming environments for mobile devices. The programming environments for mobile devices also lack a built-in central services interface to handle the integration of software components in an application program. Thus, the creation of component-oriented software is rendered difficult and becomes a custom solution. Accordingly, prior art programming environments for mobile devices present a substantial obstacle to software developers for mobile devices. Adding functionality to the operating system of a mobile device is difficult. Adding the same functionality to a mobile device having a different operating system requires in general not only a different set of function calls and programming methods, but a different programming environment altogether. Furthermore, conventional embedded software programming environments do not support global variables, thereby presenting severely limited programming environments to software developers.

Component software such as the Component Object Model ("COM") created by Microsoft Corp. for its Windows operating system provides an extremely productive way to design, build, sell, use and reuse software. COM is fully described in "The Component Object Model Specification," available from Microsoft Corp., Document No. LN24772-91 (1991) incorporated herein in its entirety by reference. COM provides the following services:

- a generic set of facilities for finding and using services providers (whether provided by the operating system or by applications, or a combination of both), for negotiating capabilities with service providers, and for extending and evolving service providers in a fashion that does not inadvertently break the consumers of earlier versions of those services;
- use of object-oriented concepts in system and application service architectures to manage increasing software complexity through increased modularity, re-use existing solutions, and facilitate new designs of more self-sufficient software components; and
- a single system image to users and applications to permit use of services regardless of location, machine architecture, or implementation environment.

COM when implemented can work only within the Microsoft Windows operating system. Thus, COM does not work across varied platforms. In addition, COM requires elaborate supporting files and a system wide registry procedure. Given the premium placed on the CPU power and storage space of a mobile device, COM does not present a viable solution for mobile devices. Furthermore, in COM, functional objects are called using dynamic link library ("DLL") files, and the calling procedure requires an explicit registry procedure. The modular scalability of COM is limited by the use of DLL files which are not programmable files and are not themselves callable objects. COM is not designed for mobile devices which must operate under restricted power and storage capability.

Examples of prior art methods providing platform independence include the CORBA architecture and Sun Microsystems' Java. A CORBA architecture employs a middle layer called Object Request Broker ("ORB") to facilitate integration of software objects. The middle layer requires memory and a CPU's processing power. CORBA is not a viable or desirable option for a mobile device.

A Java architecture employs a virtual machine which provides platform independence at run-time. A virtual machine facilitates different object components to find each other, and the object components interact with each other via the virtual machine. Because object components interact via the virtual machine, the processing speed is noticeably slowed down in a Java architecture. In addition, the virtual machine requires a large amount of memory. Furthermore, a software developer is required to use the Java language, and thus needs to expend a large amount of time and effort to become versatile in using a Java system. In addition, a large amount of legacy codes written in non-Java language becomes unavailable in a Java architecture. The Java architecture is not a or desirable option for a mobile device.

Prior art programming methods for mobile devices are inadequate. There is a need to provide flexible and platform independent programming environments for mobile devices, especially given the growing demand for and use of mobile devices.

SUMMARY OF THE INVENTION

The present invention provides software components and methods for allowing platform independence to software developers such that the developers can create, develop and test platform independent application programs. A host is compiled for a target device. When deployed on a target device, the host can provide platform independence to application programs. In general, a collection of service managers, also compiled for a target device, provides platform independent generic services, such as interacting with the mouse or touch screen of the target device or providing data management services for the target device.

A module is a collection of executable codes, thus a unit of deployable codes, corresponding to, for example, DLL files under the Windows system. In addition in the present invention, a module is an addressable and programmable object and provides a way to implicitly register software components residing on a target device. In other words, the present invention avoids the elaborate supporting files structure and procedure required for registering software components under a Windows operating system. A class is a unit of code providing a service or a plurality of services. Unlike conventional systems, a software developer needs not follow a explicit registry structure to register each class contained within the module.

The host finds each module residing on a target device using the native operating system of the target device. The host finds the single entrypoint of a module and creates an instance of the module. A communication link is established between the host and a module via IHostIHost and IModule interfaces. Once the link is established, the host requests to the module to register, and in response the module registers itself with the host. Thereafter, the module registers each of the classes contained within the module. At the end of this implicit registration process, the host includes a module-to-class table providing a mapping for each service, i.e., class, available on the target device to a corresponding module.

When a client program requests a service, the host locates the class within a module by using the module-to-class table. The host delegates the creation of an instance corresponding to the requested service to the module. The module creates and retrieves a pointer referencing to an interface of the requested instance and passes the pointer to the host. The host in turn returns the pointer to the client program, thereby establishing a connection between the client and service.

A module contains module-wide variables which can be shared among instances created from the classes contained within the module. The present invention provides an increased flexibility to the programming environments for mobile devices. A module keeps track of when it is in use and notifies the host when it is no longer in use. The present invention provides an interrupt driven unloading process, thereby reducing the CPU processing power required to manage the storage space and software components. A module also specifies dependencies on classes not contained within the module. An installer installs all required software components following the chain of dependencies. Similarly, a host can delete unnecessary modules residing on a target device, thereby conserving storage space of a mobile device and providing a dynamically extendible software system.

DETAILED DESCRIPTION OF THE INVENTION

An Overview

Figure 1:
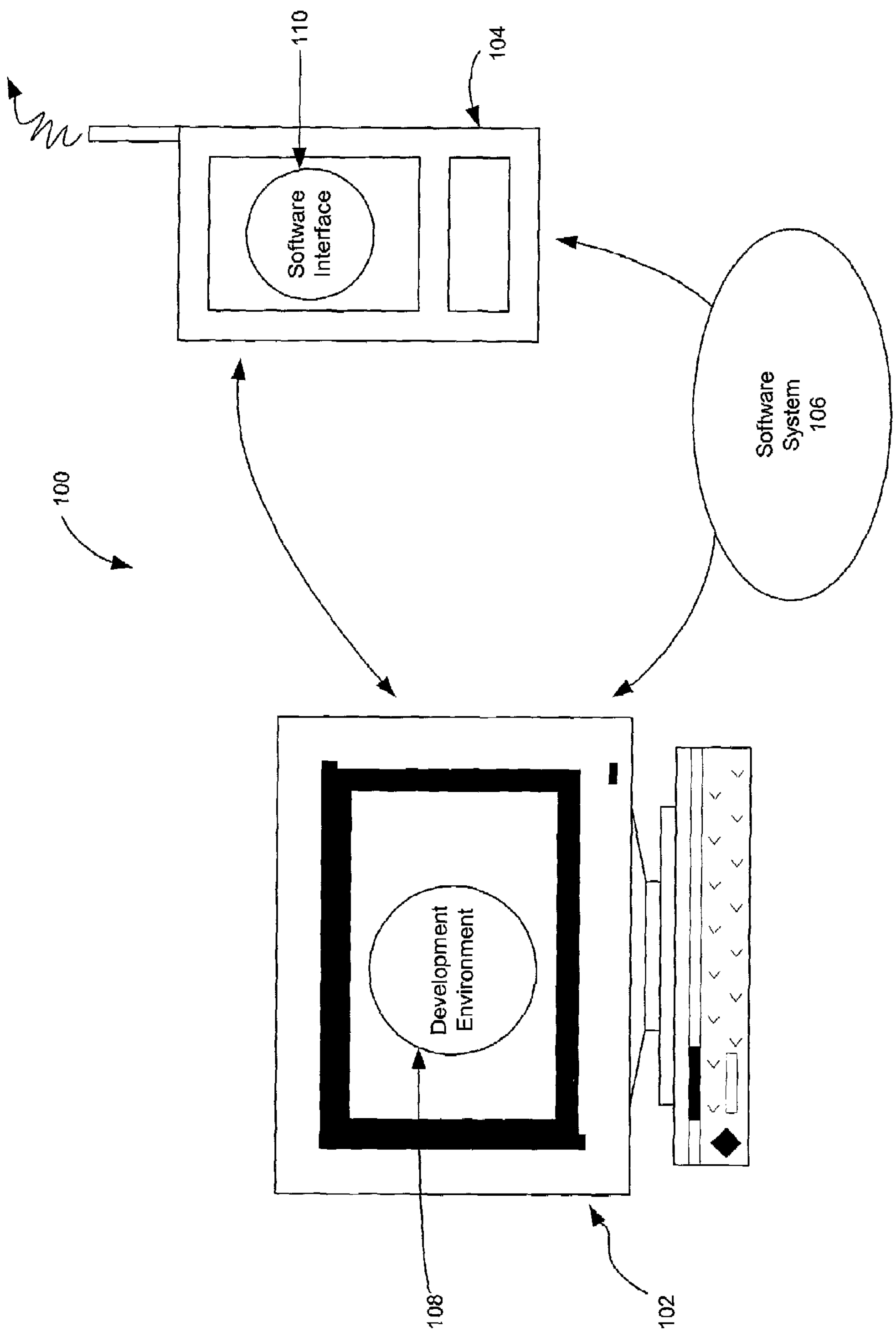
FIG. 1 illustrates an overview of an exemplary architecture according to one embodiment of the present invention.

Referring to FIG. 1, an overview of the system 100 employing the present invention is described. The software system 106 provides a generic set of software components that are dynamically extendible and deployable across different mobile devices having different architectures and operating systems. The software system 106 includes, among other things, interfaces, classes, modules and a host. Each function is defined as an interface. A class includes zero or more implementations of the interfaces. A module includes zero or more implementations of the classes. A module is a dynamically linkable and executable basic unit. The host manages shared software components by managing the modules. The host enables different modules and classes within the module to find other classes and interfaces.

The development environment 108 presented via the desktop computer 102 allows software developers to use application programs, for example, Visual Basic from Microsoft Corporation, and the software system 106 to create, develop and test software products intended for mobile devices. The development system provides a set of compilers that can build components targeted for a particular operating system residing on a target mobile device.

The software interface 110 allows software products compatible with the software system 106 to be operational regardless of the underlying architecture or operating system of the mobile device 104. The software interface 110 includes a host and core services manager. A host provides a way to integrate components compatible with the software system 106. The core services managers provide a way to integrate the functionality of the operating system on a target devices with the components compatible with the software system 106.

FIG. 1 illustrates a desktop computer 102 through which the development environment 108 is presented. Those skilled in the art will understand numerous computer systems, including a distributed computing system, may be used in the place of the desktop computer 102.

Target Device

Figure 2:
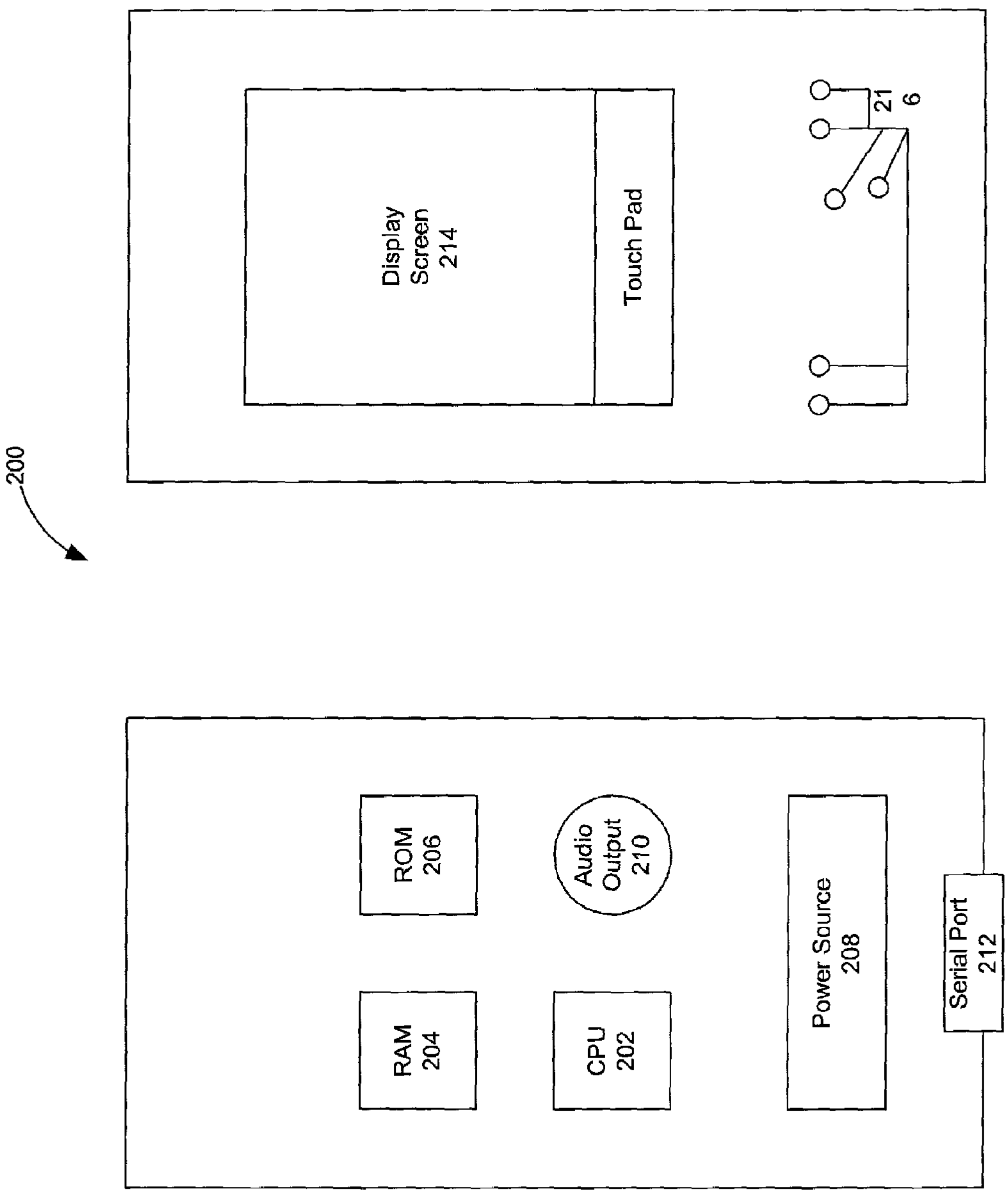
FIG. 2 is a block diagram of an exemplary mobile device.

FIG. 2 illustrates an exemplary mobile computer 200 comprising the target device on which the runtime environment 110 may run. Internally, the exemplary mobile computer 200 includes, among other things, a CPU 202, RAM 204, ROM 206, a power source 208, an audio output device 210, and a serial port 212. Externally, the mobile computer 200 includes, among other things, a display screen 214 and a touch pad 216. A user can enter inputs as well as view outputs via the display screen 214. The touch pad 216 is used to record user keystrokes. The mobile computer 200 is used as an embodiment of a target platform on which the runtime environment 110 runs. However, those skilled in the art will understand that numerous mobile devices, including mobile telephones, notepads and dictation devices, may be used in the place of the mobile computer 200.

The software system of the mobile computer 200 is synchronized during a synchronization process involving, for example, a desktop computer to which the mobile computer 200 becomes connected. As an example, software components developed in the development environment 108 for the mobile computer 200 are transported during a synchronization process. The serial port 212 is used, among other things, to uplink the software components to the target mobile computer 200. During the synchronization process, application programs running on a desktop development environment are able to access the software system of the mobile computer 200, and data may be moved back and forth between the mobile computer 200 and a desktop development environment.

An Exemplary Software System

Figure 3:
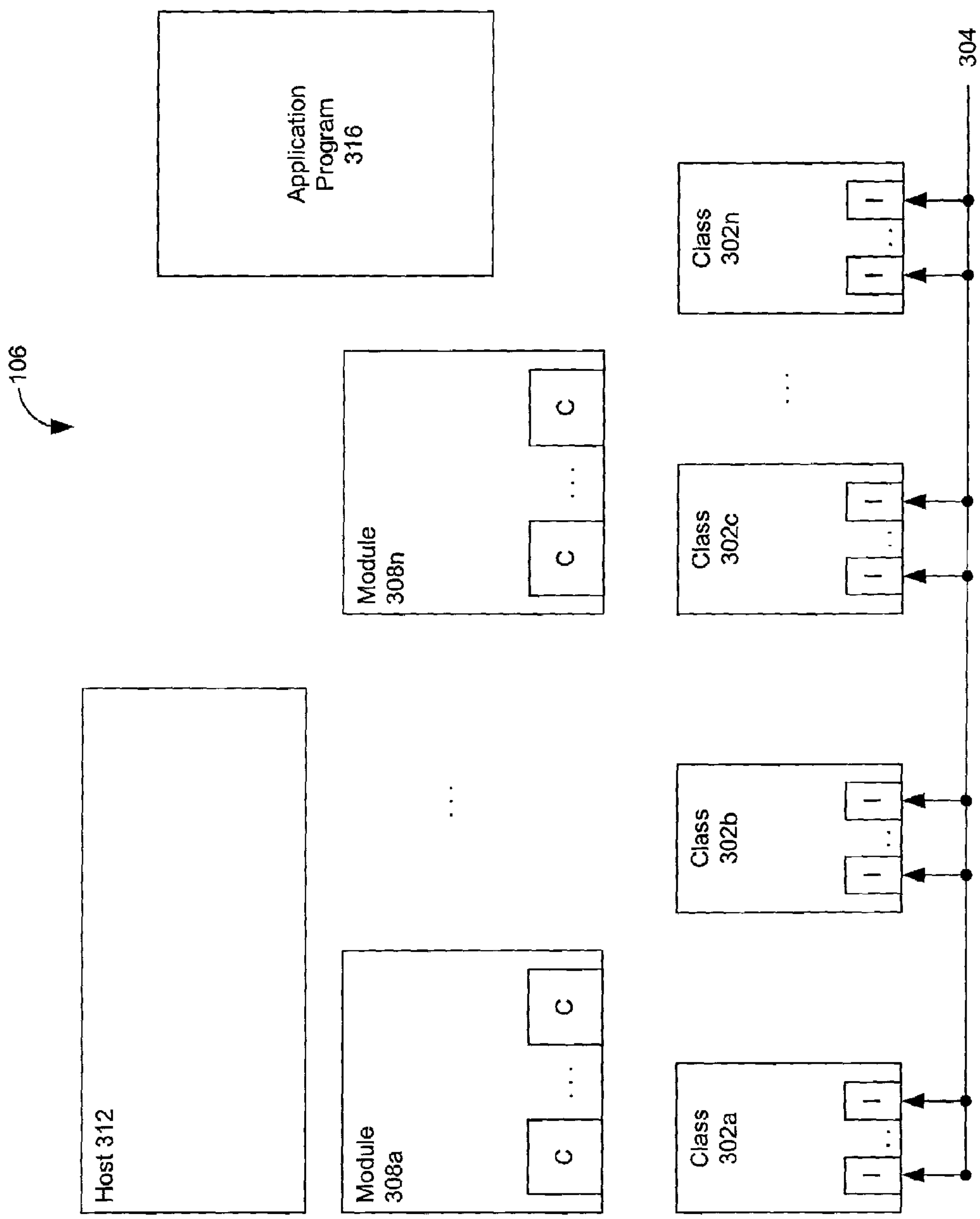
FIG. 3 is a block diagram of an exemplary software system according to one embodiment of the present invention.

FIG. 3 illustrates the software system 106 organized according to the principles of the present invention. The software system 106 includes a set of independent software components each of which may function as either a service provider, a service client, or both. The software system 106 uses the standard definitions for interface and classes used in a COM architecture. In other words, services are defined as sets of formal interfaces published by a component. Services constitute an immutable interface between a service provider and a service client. All access to software components is coordinated through one or more interfaces that the components support. A universally unique identifier ("UUID") identifies each interface.

Interfaces

Referring to FIG. 3, the software system 106 includes a plurality of interfaces, commonly designated as 304. The standard definitions, such as those used in the COM and are well known to those skilled in the art, are used for the interfaces 304. In brief, the interfaces 304 are the portion of a software component that is visible to a calling program and programmer. Each of the interfaces 304 satisfies several conditions. First, each software component can respond to a request for a given interface. A requestor invokes the IUnknown::QueryInterface function with the UUID of the desired interface. The UUID for an interface is defined as IID. If a software component supports the called interface, the component returns an interface pointer. Otherwise, the software component returns NULL. The QueryInterface function returns the same set of interfaces for a given software component throughout the lifetime of the component. Each specific function is provided by creating a corresponding interface having a UUID. Creating a new software component compatible with the software system 106 begins with the definition of its set of relevant interfaces.

Classes

Referring to FIG. 3, the software system 106 includes classes, commonly designated as 302. The standard definitions, such as those used in the COM and are well known to those skilled in the art, are used for the classes 302. In brief, a class includes a collection of interfaces and contains the specific implementation of each interface corresponding to each functionality comprising the class. Each class interacts with other classes, as well as itself, using interfaces contained within. A software developer may create new versions of a class and new interfaces within the class. However, any interfaces included in previous versions of the class are immutable and remain unaltered.

A module (discussed hereinafter) contains class implementations for zero or more classes. A class implementation exists in exactly one module. Each class is identifiable via a unique class identifier ("CLSID"). With the exception of Iunknown Interface, a given Interface is supported by zero or more class implementations.

Modules

Referring to FIG. 3, the software system 106 also includes modules, commonly designated as 308. A module is an executable that serves as the basic unit of software deployment in the software system 106. Modules are compiled for an operating system residing on a target device. In this sense, modules 308 correspond to DLLs in 32-bit Microsoft operating systems. The modules may also correspond to standard files having names with a suffix PRC in Palm operating systems. Because each operating system has its own form of dynamic linking, the exact implementation of the module 308*a* depends on the target platform. Creating a module may require statically linking startup code into the module's executable.

There is always one-to-one relationship between a module that is an executable and its associated compiled object. The host (discussed hereinafter) ensures that there is never more than one instance of a given module loaded simultaneously. Every module includes at least the IModule Interface and may include zero or more classes. A given class implementation exists only in one module. Each module executable exports one entry-point function with the following signature, modified as appropriate for a particular implementation language:

STDAPI CreateModuleObject (IHost* host, REFIID iid, void** object).

The function CreateModuleObject is called by the host to instantiate a module object. When instantiated, a module serves as a class-factory to create multiple instances of the classes it contains.

The present invention uses implicit module and class registration methods as compared to the explicit system registry structure utilized in conventional COM architectures. Once the host instantiates a module and registers the module, the module in turn registers each class contained within the module. Accordingly, a software developer is not required to declare explicitly each class contained within deployable units of software, such as the DLL files in a Windows operating system. Accordingly, the present invention simplifies the task required from a software developer and does not require an elaborate supporting file and system registry structure as the one required by a Windows system. Furthermore, because each module can also be an addressable and programmable object, the software system of the present invention provides increased modularity in comparison to a conventional COM architecture.

Figure 4:
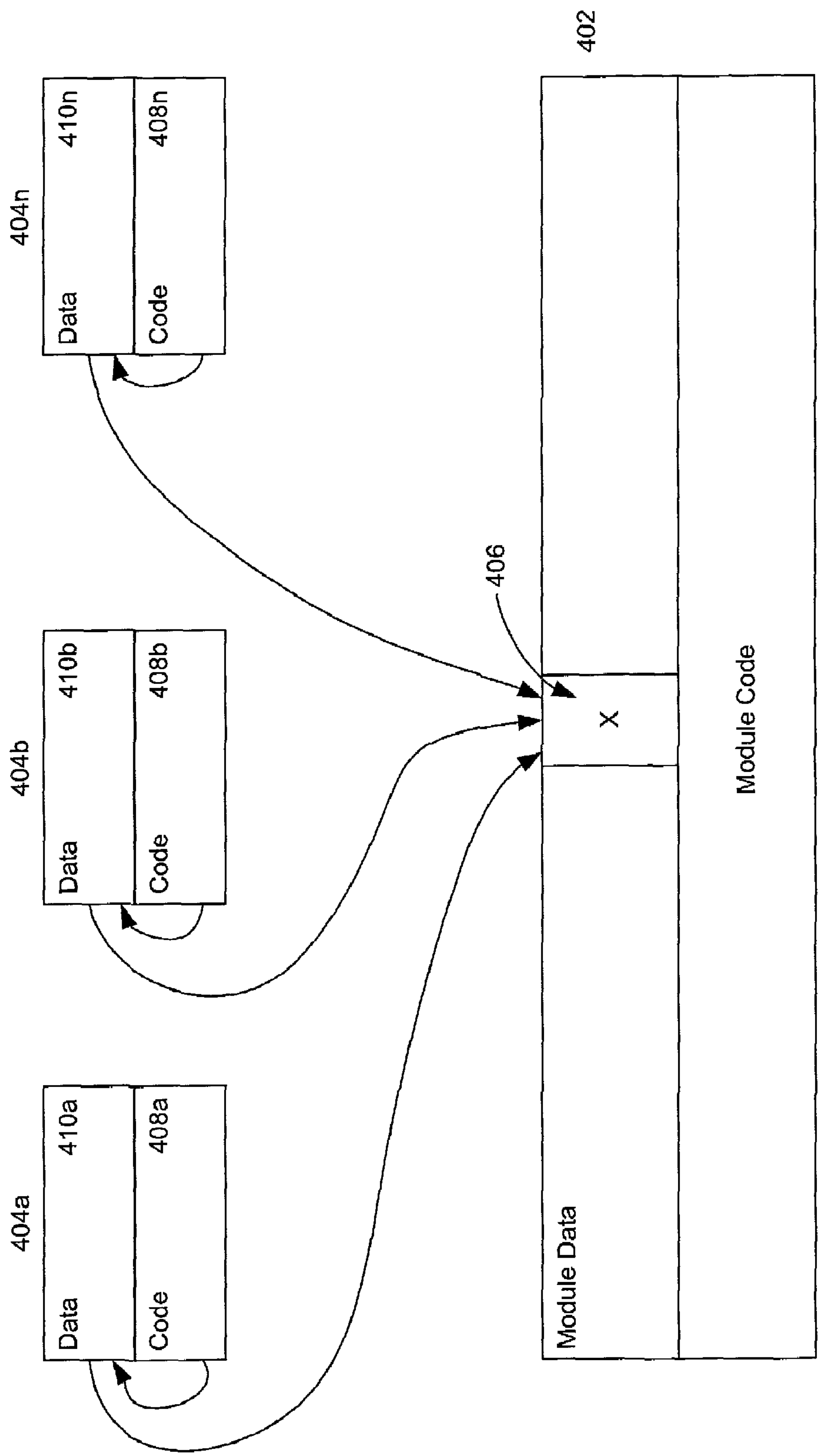
FIG. 4 is a block diagram illustrating an exemplary embodiment of module-wide variables.

Each module must implement the IModule interface. In addition, a module may also choose to implement additional interfaces. Referring to FIG. 4, a plurality of class instances, commonly designated as 404, have a way to share module-wide variables. A class code 408*a* can access and manipulate a module-wide variable X, 406, via indirection through its local data, 410*a*. The module-wide variable X is stored in a module-wide memory space of the module instance 402. The module 402 contains implementations of classes corresponding to the class instances 404*a*, 404*b* . . . 404*n*. Accordingly, the plurality of class instances formed from one or more of the classes contained within the module corresponding to the module instance 402 can share the module-wide variable X. The module-wide variables afford flexibility which is not available in conventional programming environments for mobile devices.

Each module can also specify dependencies on classes that are not contained within the module. This characteristic is important because a chain of dependencies can be followed to install all required components, thereby ensuring an application program will run upon installation. Furthermore, following the dependencies specified in a module, the host (discussed hereinafter) can delete modules that are not required by any applications residing on a target device, thereby saving the memory space of a mobile device.

Each module can also keep track of its use during the run time. The conventional method of unloading a module employs a polling mechanism. The CPU polls through each instantiated module and asks if the module can be unloaded. This procedure consumes the CPU's processing power. According to the principles of the present invention, a module can notify the host when it is no longer in use, thereby reducing the CPU power required to unload modules.

The Host

Referring to FIG. 3, the software system 106 includes a host 312. The host 312 can enable different modules and classes within the modules to find other classes and interfaces. The host 312 includes standard functions for initializing a module, creating an instance of a class and performing other basic system functions, such as running an application. The host 312 can also enable a client application 316 to find requested modules and classes. Accordingly, the host provides management and integration functions for the software system 106 and the client application 316.

A host is compiled for a target device and thus is operating system dependent. However, once deployed on a target device, a host provides platform independence for components compatible with the software system 106. The host 312 runs when new functional libraries which require registration becomes available on the target device. As an example, a host deployed on a Palm operating system runs automatically upon synchronization of data between the target device and, for example, a desktop computer. The host also runs automatically upon a system reset. When the host 312 executes, it searches for new functional library classes, which are designated by a special flag. For example, when deployed on a mobile device having a Palm operating system, the host 312 requests to the Palm operating system to search for files containing a unique ASCII string, "zpco," and the operating system responds to the host by providing the locations in which the files with the unique ASCII string reside. In other words, any software components having a special flag can be identified and registered by the host 312.

The host 312 can ensure that there is never more than one instance of a given module at a time and instantiates a module object by calling a create module function, such as the CreateModuleObject function described in connection with the modules. The host 312 manages and keeps track of modules and classes using a 16-byte unique universe identifier ("UUID") assigned to each module and class. No two UUID's can be the same.

The host 312 can actively interact with the modules. Specifically, a module 308*a* can notify the host 312 when it is no longer in use, and in response, the host can unload the module, thereby managing and conserving the RAM space of a mobile device. The use of an interrupt-driven unloading system avoids a central unloading process, thereby conserving the operation time of the central processor.

The host 312 can ensure that only required modules are installed on a target platform. The host 312 can search for and delete modules not in use by any application programs. Because the host 312 can incorporate only the software components required by application programs, the host 312 can make an otherwise static software system of a target platform into a dynamic software system. In addition, because modules can register dependencies on other classes, an installer can follow the chain of dependencies and includes all required modules on the target computer. The present invention provides capability to conserve storage space of target devices.

The host 312 also has capability to update classes within a module without having to replace the entire module. A new version of a class having the same unique identifier as an old class can be placed in a new module and uploaded to a target device. Once the new class becomes registered with the host 312, the new class supercedes the old class. Accordingly, a class can be replaced without having to duplicate all other classes within a particular module. The present invention provides means to conserve storage space of target devices because the host can update a class without duplicating classes contained within a module.

Software Interface on a Target Device

Figure 5:
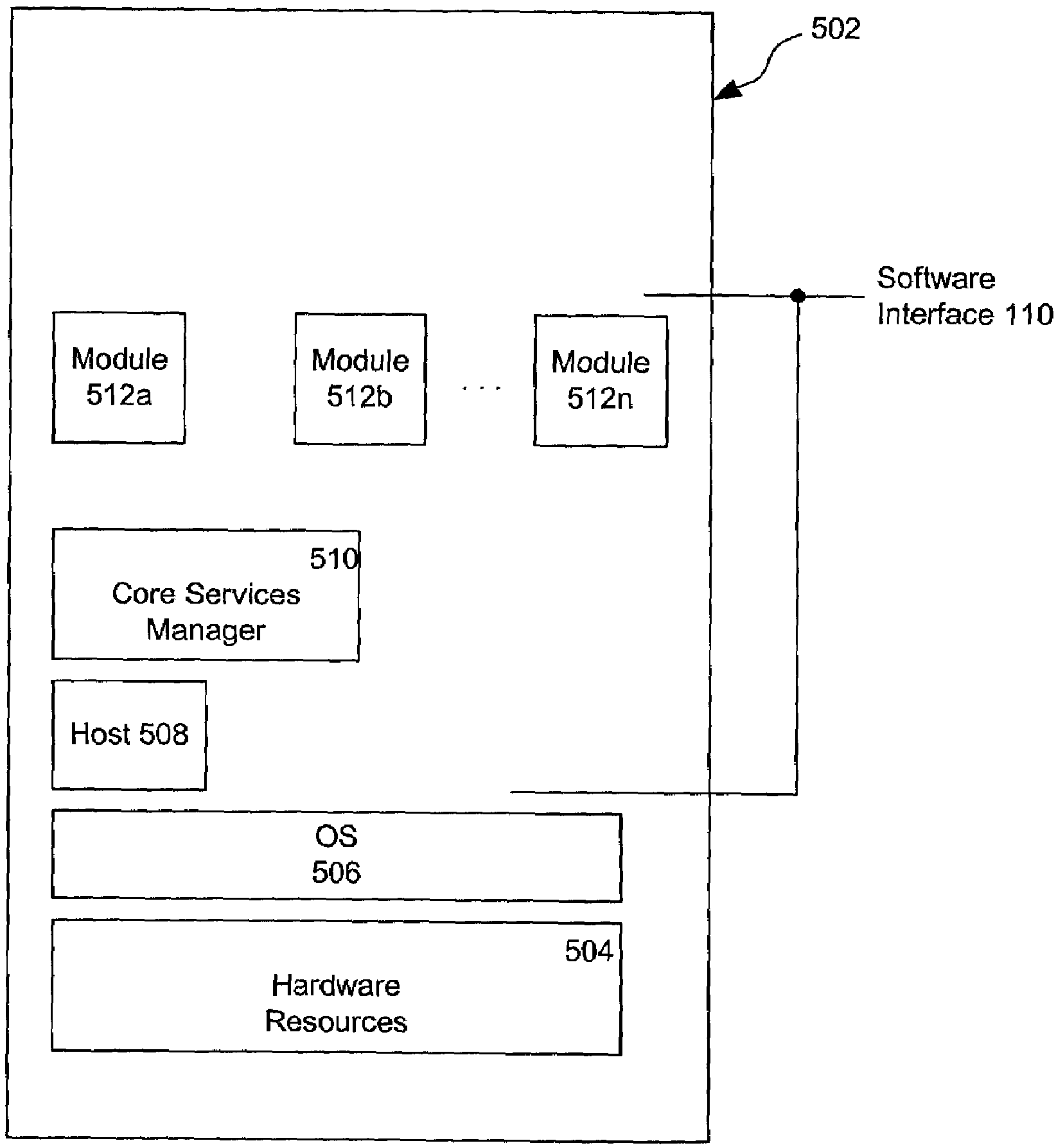
FIG. 5 is a block diagram of an exemplary software system of a mobile device having a software interface according to the principles of the present invention.

Referring to FIG. 5, the operation of the software interface 110 deployed on a target handheld computer 502 is described. An operating system 506 native to the handheld computer 502 manages hardware resources 504. The host 508 is compiled for the target mobile computer 502. In particular, the host 508 is compiled to be operational on the operating system 506 and make use of functionalities provided by the operating system 506. The core service manager is also compiled for a specific target device having a particular operating system. In this example, the core services manager 510 is compiled to be operational on the operating system 506 and provide certain generic functions corresponding to the native functions provided by the operating system 506.

The host 508 and core services managers 510 provide platform independence to application programs running on the target mobile computer 502. The platform independence is achieved because the host can manage and integrate shared component objects, each having at least one specified, standard interface. The core services manager includes a plurality of service managers, each performing a task for a component class. Specifically, a service manager provides the code that is common to all components comprising a specific component category. For example, a component class may be sensitive to real-time events. A manager for such a component class concerned with real-time events applies the results from real-time events to a global context manager or to a particular component instance. An exemplary service manager is a window manager that manages events related to a mouse and touch screen of a mobile device. Another service manager is a database manager, which provides structured access to variety of information sources present on the device. Any component specific code is provided by the component executable. For example, the paint code for a button is different from a listbox, thus the paint code is isolated as a component.

Figure 6:
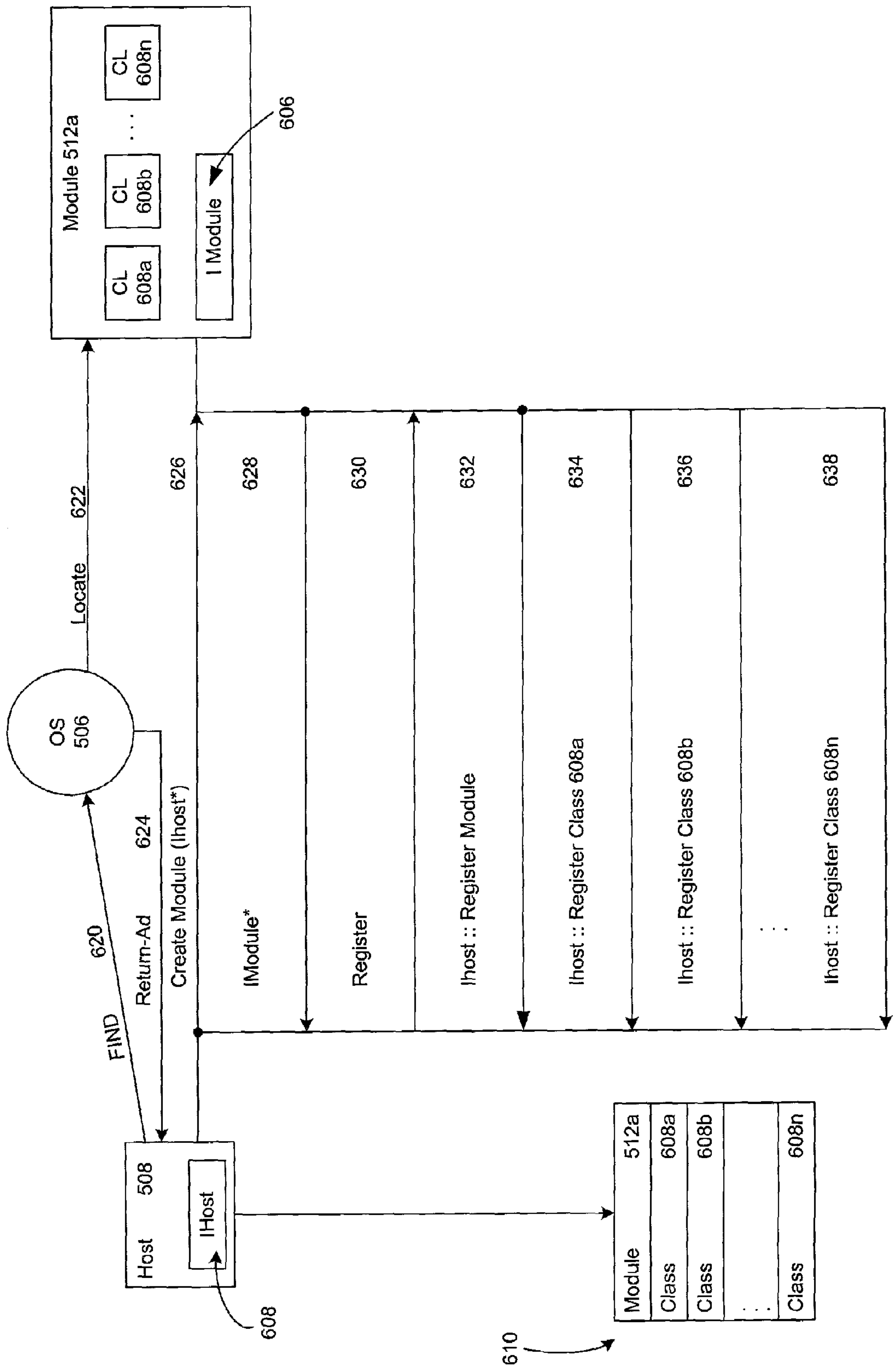
FIG. 6 is a block diagram of an exemplary registration process according to the principles of the present invention.

The software interface 110 also includes modules, commonly designated as 512. Referring to FIG. 6, the aforementioned implicit registration process on a target device is described. In step 620, the host 508 requests to the operating system 506 to find modules residing on the target device 502. In step 622, the operating system locates the module 512*a* and returns in step 624 an address of the module 512*a* to the host 508. The request for and identification of each module residing on the target device 502 is accomplished using a special flag contained within the module. For example, for a Palm operating system, the host 508 requests for each module containing the unique ASCII string "zpco." Each module deployed on a specific operating system is targeted for that particular operating system. For example, for a target device having a Palm operating system, a module is compiled using the compiler compatible with the Palm operating system.

The module 512*a* includes a module-communication interface, IModule interface 606 and a plurality of classes, commonly designated as 608. In step 626, the host 508 invokes a single entry point, such as the CreateModuleObject function, and passes a pointer to its host-communication interface, IHost 608, to the module 512*a*. In response, the module 512*a* creates an instance of itself, and in step 628, the module 512*a* returns a pointer to its IModule interface 606 to the host 508. Upon receiving the return value of the IModule, the host 508 can communicate with the module 512*a*. In other words, the communicational link between the host 508 and the module 512*a* is established. In step 630, the host 508 requests to the module 512*a* to register. For example, the host invokes a Register method of the module 512*a*. In step 632, the module 512*a* answers to the host's registration request. For example, the module 512*a* invokes a host-register-module function, such as the IHost::RegisterModule function of the host 508, to register itself. Thereafter, in steps 634 through 638, the module 512*a* registers each class contained within the module. For example, the module 512*a* invokes a host-register-class function, such as the IHost::RegisterClass function of the host 508, for each class contained within itself. After the last class 608*n* is registered in step 638, the host 508 has a module-to-class table 610 providing a mapping of the unique class identifiers corresponding to classes 608 to the unique module identifier for the module 512*a*. In other words, the Host 508 knows which classes are available via the module 512*a*. Accordingly, the present invention provides an implicit registry, thereby simplifying the registration procedure and conserving the storage space and the CPU power of a mobile device. The implicit registration procedures described in connection with FIG. 6 is performed for each module found by the host 508.

After the registration of the modules residing on the target device, in general, the host 508 stops running. The host 508 is woken up, for example, when a client application needs its services. For example, when an end-user of the handheld computer 502 taps an application to initiate a program, the operating system 506 brings the application program into memory, and the application program calls the host 508. The application program invokes a host-initialize function, such as the pCoInitialize function of the host 508. In response to the host-initialize function, the host 508 becomes instantiated and initialized. The application program establishes communication channel with the host, by invoking an obtain-host-channel function, such as the pCoGetHost function. Once a communication channel is established, the host creates instances of services requested by the client application. When terminating, the application program calls a host-unintialize function, such as the pCoUnitialize function to release the services it had requested to the host 508.

Figure 7:
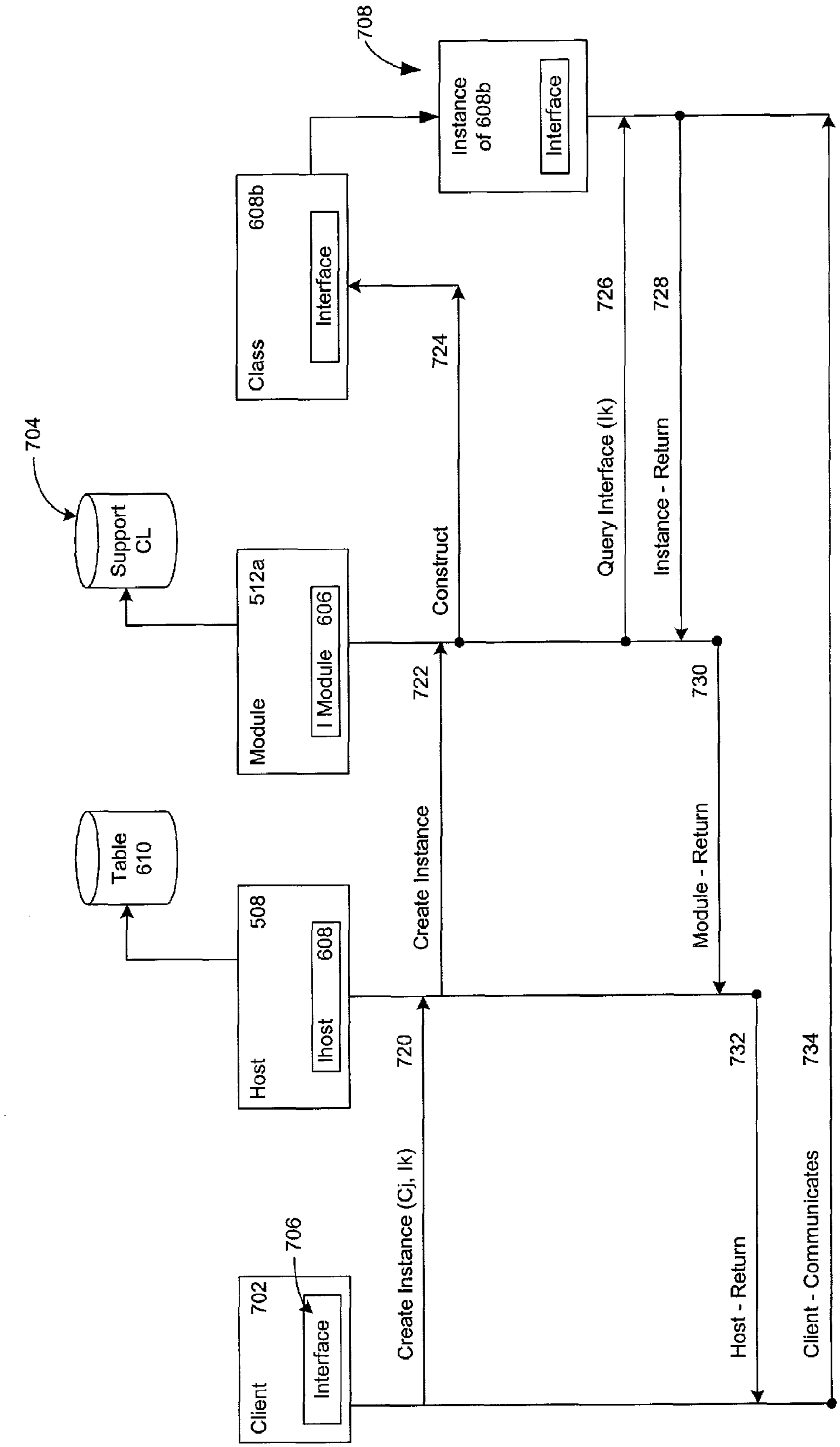
FIG. 7 is a block diagram of an exemplary class instantiation process according to the principles of the present invention.

Referring to FIG. 7, a class instantiation process is described. In step 720, a client 702 requests to the host 508 to create an instance of class 608*b*, that is, $C_j$ in step 720. In step 720, the client also specifies that the class 608*b* be accessible via an interface $I_k$. The client 702 may be an application program or another module residing on the target device 502. The host 508 identifies the module that contains the requested class by referencing its module-to-class tables created during the module registration process. In this case example, the host 508 determines that the class 608*b* is contained in the module 512*a*. The host 508 creates an instance of the module 512. In step 722, the host 508 requests via the IModule interface 606 that the module 512*a* creates a class instance of the class 608*b*. The module 512*a* looks up the class identifier of the class 608*b* in its own list 704. The list 704 identifies the classes the module 512*a* supports. Upon finding the class 608*b* in the list 704, the module 512*a* invokes a constructor of the class 608*b* in step 724, thereby creating a new instance 708 corresponding to the class 608*b* In step 726, the module 512*a* invokes a query-interface function, such as the QueryInterface method, on the class instance 708. In step 728, the new instance 708 passes a pointer to the interface $I_k$. Upon retrieving the requested interface, the module 512*a* returns the pointer to the host 508 in step 730. The host 508 in turn returns the pointer to the client 702 in step 732. Thereafter, for example, in step 734, the client communicates directly with the class instance 708. The class instantiation procedure described in connection with FIG. 7 is performed for each service requested by the client 702.

The foregoing is provided for purposes of explanation and disclosure of preferred embodiments of the present invention. Further modifications and adaptations to the described embodiments will be apparent to those skilled in the art and may be made without departing from the spirit and scope of the invention and the following claims.

What is claimed is:

1. A method for providing platform independence for software products comprising:

storing a host on a target device, said host configured to provide a client with a pointer to an instance of a requested class;

storing a module on the target device, wherein the module is a deployable unit having a plurality of executable codes and is an addressable and programmable object at run-time; and implicitly registering the module with the host, said action of implicitly registering including:

establishing a communication link between the module and the host;

the host requesting that the module register itself with the host using the communication link;

in response to the host requesting that the module register itself with the host, the module registering itself and at least one class associated with the module using the communication link; and in response to the module registering itself and the at least one class associated with the module, the host updating a mapping that associates the module with each of the at least one class associated with the module.

2. The method of claim 1, wherein the action of implicitly registering the module further comprises:

the module facilitating the registration of the at least one class with the host by registering each of the at least one class using the communication link.

3. The method of claim 1, wherein the step of updating the mapping includes:

providing a module-to-class table.

4. The method of claim 1, wherein the module comprises a plurality of classes and a module-wide variable, wherein said module-wide variable facilitates a plurality of instances constructed from the plurality of classes to share the module-wide variable.

5. The method of claim 1, wherein the target device comprises a mobile device.

6. The method of claim 1, wherein the host is compiled for an operating system residing on the target device.

7. The method of claim 1, further comprising:

storing a plurality of service managers on the target device, each service manger providing a code common to all software component comprising a specific component category.

8. The method of claim 7, further comprising:

compiling the service managers for an operating system residing on the target device.

9. The method of claim 1, further comprising:

running the host automatically upon a system reset.

10. The method of claim 1, further comprising:

running the host automatically upon a synchronization of data between the target device and another computing device.

11. The method of claim 1, further comprising:

registering a dependency on a class not contained within the module.

12. The method of claim 11, further comprising:

following the dependency registered by the module and installing the class not contained within the module.

13. The method of claim 11, further comprising:

the host deleting the module based on the dependency registered by the module.

14. The method of claim 1, further comprising:

the module tracking when it is in use and notifying the host when it is not in use.

15. The method of claim 14, further comprising:

the host unloading the module upon being notified by the module that the module is no longer in use.

16. The method of claim 1, further comprising:

compiling the module for an operating system residing on the target device.

17. The method of claim 1, wherein the module comprises a class having a unique identifier, and wherein the method further includes:

updating the class by registering with the host a new class having the same unique identifier.

18. The method of claim 1, wherein the host includes a host-communication interface and the module includes a module-communication interface, and the step of establishing the communication link between the host and the module includes:

the host passing, to the module, a pointer to the host-communication interface; and the module passing, to the host, a pointer to the module-communication interface.

19. A computer implemented method for providing platform independence to software components by employing a host, comprising:

passing a pointer referencing to a host-communication interface to a software component, said component comprising a plurality of executable codes and being an addressable and programmable instance at a run-time;

requesting the software component to create an instance corresponding to the component;

requesting the software component to register itself with the host;

accepting a registration from the software component; and the host deleting unnecessary software components from a target device by following a chain of dependencies provided by the software component.

20. The method of claim 19, comprising:

accepting a registration of a class requested by the software component, said class contained within the software component.

21. The method of claim 19, comprising:

updating a class assigned with a unique class identifier and contained with the software component by registering a new class having the unique class identifier and contained in another software component.

22. The method of claim 19, further comprising:

compiling the host for an operating system residing on a target device.

23. The method of claim 19, comprising:

the host providing a mapping for a class contained within the software component at a time after receiving the registration from the software component.

24. The method of claim 19, comprising:

delegating a creation of a class instance corresponding to a class contained within the software component to the software component.

25. The method of claim 19, further comprising:

deploying the host on a target mobile device.

26. A method comprising:

deploying a generic set of software components on a target device, the software components capable of being deployable across devices having different architectures and operating systems, the components including a host, a client, and a module, the module including a plurality of executable codes and wherein the host is configured to provide the client with a pointer to an instance of a requested class; and implicitly registering the module with the host, the action of implicitly registering comprising:

establishing a communication link between the host and the module;

receiving a request to register the module with the host on the communication link, the request received by the module;

upon receiving the request, the module registering itself and at least one class associated with the module using the communication link; and in response to the module registering itself and the at least one class associated with the module, the host updating a mapping that associates the module with each of the at least one class associated with the module.

27. The method of claim 26, further including:

the module registering a dependency on a class not contained within the module.

28. The method of claim 27, further including:

installing the class not contained within the module based upon the dependency registered by the module.

29. The method of claim 27, wherein upon detecting that the module is not required by any applications residing on the target device:

the host deleting the module based on the dependency.

30. The method of claim 26, further comprising:

the module notifying the host upon detecting that the module is not in use.

31. The method of claim 30, further comprising:

the host unloading the module responsive to being notified by the module that the module is no longer in use.

32. The method of claim 30, wherein the step of the module notifying the host is interrupt driven.

33. The method of claim 26, wherein the host includes a host-communication interface and the module includes a module-communication interface, and the step of establishing the communication link between the host and the module includes:

the host passing, to the module, a pointer to the host-communication interface; and the module passing, to the host, a pointer to the module-communication interface.

34. A computer implemented method for providing platform independence to software components by employing a host, comprising the steps of:

passing a pointer referencing to a host-communication interface to a software component, said component comprising a plurality of executable codes and being an addressable and programmable instance at a run-time;

requesting the software component to create an instance corresponding to the component;

requesting the software component to register itself with the host;

accepting a registration from the software component; and the host providing a mapping for a class contained within the software component at a time after receiving the registration from the software component.

35. The method of claim 34, further comprising the step of:

accepting a registration of a class requested by the software component, said class contained within the software component.

36. The method of claim 34, further comprising the step of:

the host deleting unnecessary software components from a target device by following a chain of dependencies provided by the software component.

37. The method of claim 34, further comprising the step of:

updating a class assigned with a unique class identifier and contained with the software component by registering a new class having the unique class identifier and contained in another software component.

38. The method of claim 34, further comprising the step of:

compiling the host for an operating system residing on a target device.

39. The method of claim 34, further comprising the step of:

delegating a creation of a class instance corresponding to a class contained within the software component to the software component.

40. The method of claim 34, further comprising the step of:

deploying the host on a target mobile device.

* * * * *